Jan. 31, 1933.  V. B. NELSON  1,895,814
EDUCATIONAL DEVICE
Filed Jan. 10, 1931   2 Sheets-Sheet 1

Inventor:
Victor B. Nelson
By Wilson, Dowell, McCanna & Dehm
Attys.

Jan. 31, 1933.   V. B. NELSON   1,895,814
EDUCATIONAL DEVICE
Filed Jan. 10, 1931   2 Sheets-Sheet 2

Inventor:
Victor B. Nelson
By Wilson, Dowell, McCanna & Rehm
Attys.

Patented Jan. 31, 1933

1,895,814

UNITED STATES PATENT OFFICE

VICTOR B. NELSON, OF ROCKFORD, ILLINOIS

EDUCATIONAL DEVICE

Application filed January 10, 1931. Serial No. 507,792.

This invention relates to the art of sculpturing, and is particularly concerned with an educational device or medium useful in the study of sculpturing, with a view to encouraging the study of art, and more generally promoting its appreciation.

The principal object of my invention is to provide a homogeneous block or bar of plastic material, such as soap, in which portions of an art object of any one of a large variety of forms are shown obscured more or less by material, which is purposely left there in the molding or otherwise forming of the block for the student to remove with such skill as he may have at his command. Obviously, the object to be produced may be a statue, that is, a sulpture proper in three dimensions, or a plaque, namely, a relief where the thickness or depth dimension is relatively reduced. In accordance with the invention, it is, therefore, possible for the student to produce the general form of the object fairly easily, using that portion or portions of the object which is visible to him at the outset between the projections of excess material as a guide or foundation, and, thus encouraged by the apparent ease with which the results thus far have been accomplished, the student is encouraged to try to smooth off the rough places and produce the finer delineations on the object, according to his skill and artistic ability.

It is another object of my invention to further promote the development of artistic ability in sculpturing by providing the blocks, graded or classified, with less and less of the object to be sculptured from the block distinguishable at the outset so that the student is given the opportunity of fashioning by his own effort and skill more and more of the art object from the blank piece, and relies less and less upon guides.

According to my invention, the block of plastic material is preferably formed with bars or any other suitable form of projections of the superfluous or excess material that has to be removed to produce the object which it is intended is to be sculptured. This excess material is preferably provided on the body in such a way that it aids in holding the body of the object in or on a frame up to the time the block is to be sculptured. In the case of a statue, the base therefor is arranged to be formed by one side of the frame, the student cutting away the rest of the frame in roughing out the object. In view of the fact that soap makes an ideal substance for working in this manner, I prefer its use, but, of course, do not limit the invention thereto. The soap chips produced can be used as any other soap chips so that there is no waste. On the other hand, an object made of soap is lasting and will not collapse with heat, so that the student is encouraged to keep the objects he produces and has the opportunity of comparing his work as his experience grows and his skill and ability are developed.

It is also contemplated to have the student eventually work from pictures giving the exact proportions of an object for a good artistic job. This would, of course, involve even greater skill than in the case of the use of the most advanced class of sculpturing blocks provided in accordance with my invention, and in the case of the average person, might be looked upon as the goal toward which he is striving in working through the preliminary classes of blocks, although, of course, the few who are more gifted would not be so limited, but could advance even beyond the working from the picture of the object to be sculptured.

The invention is illustrated in the accompanying drawings, in which—

Figure 1:
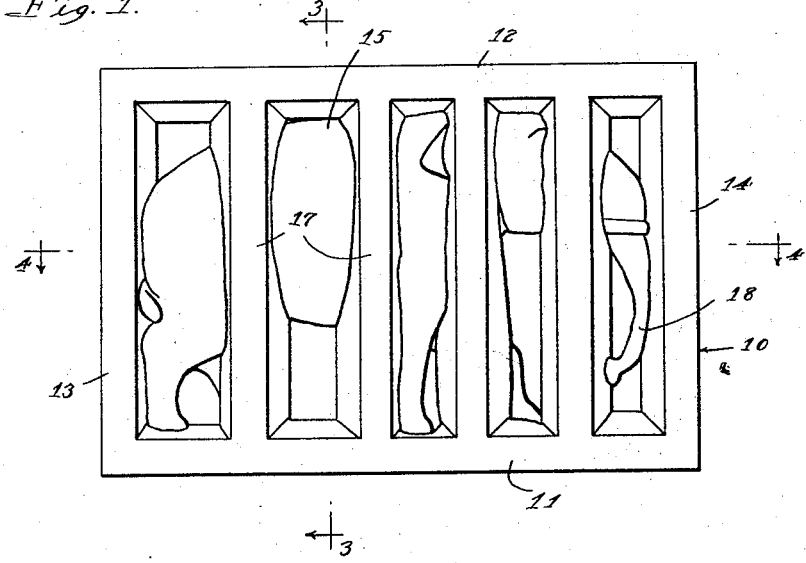
Figure 1 is a side view of a block of plastic material made in accordance with my invention showing how the outline of the object to be sculptured is vaguely discernible.
Figure 4:
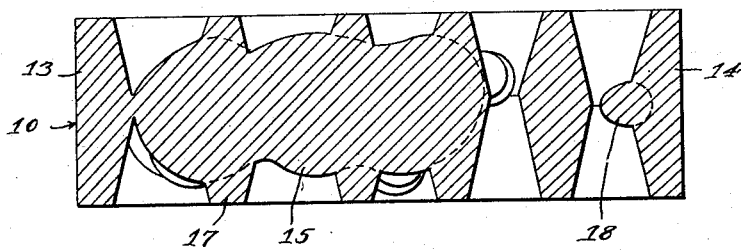
Figure 3:
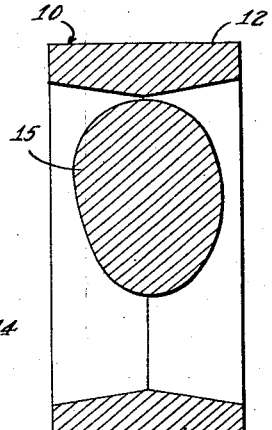
Figure 5:
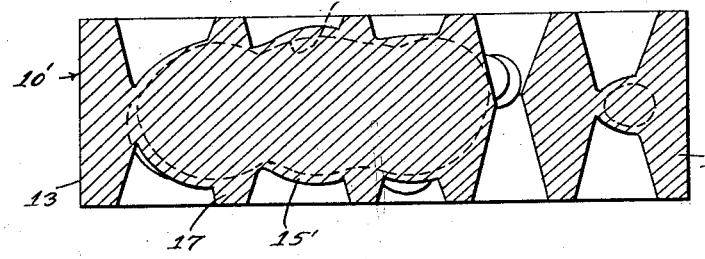
Figure 6:
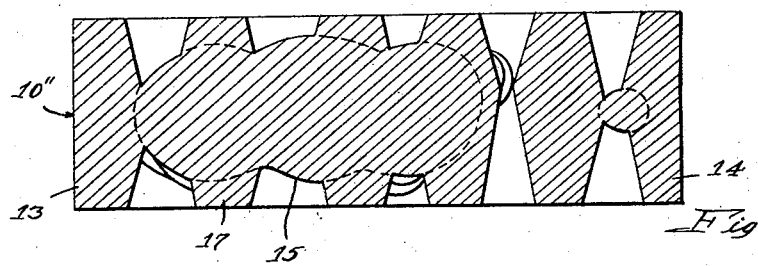
Figure 8:
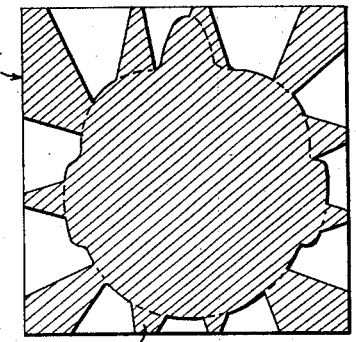
Figure 7:
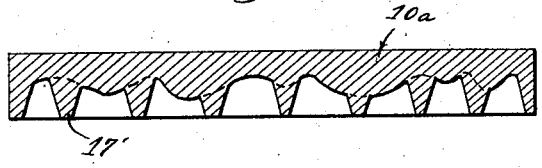

Figs. 3 and 4 are vertical and horizontal sections taken on the lines 3—3 and 4—4 of Figure 1;

Fig. 5 is a view similar to Fig. 4, showing one form of advanced grade or class of block;

Fig. 6 is a similar view showing another form of advanced grade or class of block;

Fig. 7 is a view similar to Fig. 4 showing the application of the invention to a plaque, and Fig. 8 is a similar section showing the invention applied to an object having the four sides in relief.

Similar reference numerals are applied to corresponding parts throughout the views.

Referring to Figs. 1–4, the block or bar designated generally by the reference numeral 10 is formed in one piece of soap, preferably by molding, although the same form as hereinafter described, might be produced by subjecting a plain bar of the plastic material to pressure between dies, that being a common expedient in the soap making industry. While reference is made to the use of soap, it should be understood at the outset that any plastic material might be used, such as wax or tallow mixtures, modeling clay, molding clay, and similar workable materials. On the other hand, the invention is not limited to such soft materials since plaster of Paris, plastic wood, and other materials of that kind would be useable, although I prefer soap or other materials of similar characteristics, because they are more readily workable with tools, or may be fashioned in the hands. In the case of soap, different colors are obtainable, as is well known, so that suitable colors can be selected for different objects to be sculptured. Then, too, there is the advantage in the use of soap that it is inexpensive and there is no waste, because the soap chips produced can be used like any other soap chips. Soap is also ideal for this sort of work because it can be cut so smoothly and easily, and the resulting object will last indefinitely because it is not subject to collapse with ordinary room temperatures, like wax or tallow. The fact that the material is so easily workable is the thing that makes a special appeal to children, and parents need have no fear that the child will be injured in the handling of a sharp-edged tool, because relatively dull tools can be used. From the commercial standpoint there is also the advantage that the sale of soap is promoted, and that ultimately tends to promote personal cleanliness and sanitation. However, the advantages just enumerated as going with the use of soap in the practice of my invention are secondary in comparison with the main advantage of the invention, which is to encourage the study of art, especially in the young, and to promote a more general appreciation of art.

Figure 2:
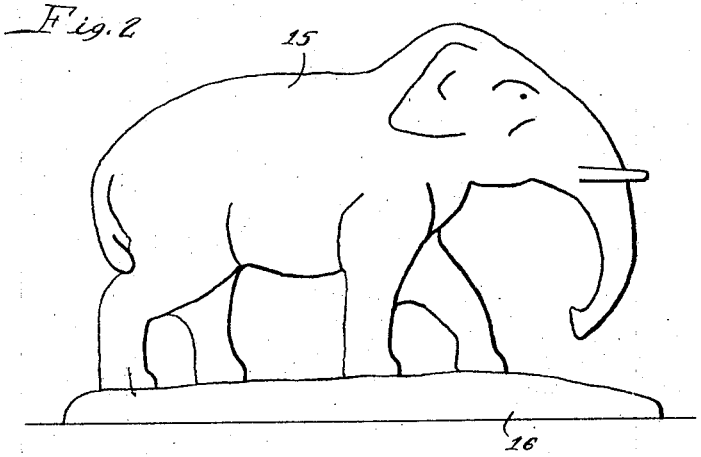
Fig. 2 is a side view of the finished object produced from the block.

The blocks 10 are homogeneous and are, in accordance with my invention, made in the form of a frame having a bottom portion 11, a top portion 12, and end portions 13 and 14. The frame encloses material therein integral with the frame and destined to form the body portion 15 of any object, animal or otherwise, which is to be sculptured. The student in roughing out the object has to cut away most or all of the frame, it being preferable to leave the bottom 11 to form the base 16 of the finished art object, as shown in Fig. 2. In addition, there are cross bars 17 which more or less obscure the object to be sculptured, and these bars must also be cut away in roughing out the object. The bars are shown as made substantially parallel and as extending vertically from the bottom 11 to the top 12, but, of course, they may be provided at angles to one another and may extend lengthwise from one end 13 to the other end 14. Then, too, the invention is not limited to the use of bars, since any form of projection of excess material that has to be removed can be provided. The bars serve, of course, to hold the body portion of the object in its frame up to the time the block is used in sculpturing the object. The object can be roughed out more or less easily, and the student is encouraged thereby to proceed to the more delicate work of smoothing the object down to the exact size desired and working out the finer delineations, as for example, about the eyes and ears, and so forth. There is, of course, no need for the student to rough out the whole object at one time and then proceed to the finer sculpturing of the object; he can work from one end to the other if so desired, or from the top down or bottom up. In any event, it is obvious that the excess material is removed using so much of the outline of the object as is visible to begin with between the projections of excess material as a guide or foundation. This enables a beginner to produce objects of more or less artistic value so that he is encouraged in the study of art and will go further.

In accordance with another phase of my invention, as stated before, the blocks from which the objects are to be sculptured may be provided in different grades or classes in which there is less and less of the final object discernible because of the increased amount of excess material that has to be removed. Thus, I have shown in Fig. 5 a block 10' in which the body portion 15' of the object to be sculptured is somewhat larger than the body portion 15, as indicated by the dotted outline a. That is to say, there is more surplus material to be removed in working block 10' than in working block 10, and naturally, that requires a greater degree of skill. The block 10'' shown in Fig. 6 is similar to Fig. 4 in so far as the body portion 15 of the object to be sculptured is concerned, but has the bars 17' of greater width so that less of the form of the object to be sculptured is distinguishable at the outset. Naturally, instead of increasing the width of the bars, a greater number of bars could be used in the more advanced grades of blocks. The object in any event is to make it more and more difficult to sculpture the object the more advanced the grade of block becomes. The object in this case happens to be an elephant, and it will be observed by comparison of Fig. 4 with Figs. 5 and 6 how the trunk 18, for example, while readily distinguishable in the block 10 is more obscured in the blocks 10' and 10''. This holds true, of course, for all of the other parts of the object. It follows, therefore, that the student is given a real incentive to develop skill and artistic ability by working from the simplest to the most difficult blocks to sculpture. It is believed that many will find it possible eventually to sculpture an object from a plain block of the material, especially after having worked through all of the grades or classes of blocks. I contemplate providing pictures from which students in the advanced classes may work. That would be as far as the average person of limited artistic ability would probably get, but, of course, those specially gifted would not be so limited, and would naturally work to the point of actually sculpturing artistic creations.

In passing, it should be understood that while I have shown blocks in which substantially the entire object to be sculptured is more or less distinguishable, I contemplate, especially in the more advanced grades of blocks, to provide some blocks in which only one portion of the object to be sculptured is at all distinguishable, the rest of the block being perfectly blank and arranged to be worked to a predetermined form, or else worked to any form the student may select. For example, if the block contain portions of what is to represent the body of a dog, let us say, the head end may be left perfectly blank, and the student can sculpture that portion as he desires to give the dog any particular pose which may suit the fancy of the student. On the other hand, the blocks may be formed so that the head end of an object to be sculptured is distinguishable at the outset, and the body is arranged to be sculptured in any artistic, grotesque, or other form which the student may select. It will be evident that blocks made in this way worked by advanced students will tend to develop the creative abilities.

In Fig. 7 a block 10a intended for a plaque is shown having bars or other suitable projections 17' of excess material on the face thereof which must be removed. Here again the idea of having different classes or grades of blocks could be followed either by providing a greater excess of the material on the background or in the projections. In Fig. 8 the invention is shown embodied in a block 10b, all four sides of which will require sculpturing. Here again bars or other projections 17'' of excess material are provided which it is up to the student to remove.

It is believed the foregoing description conveys a good understanding of my invention and all of its objects and advantages. The appended claims have been drawn with a view to covering all legitimate modifications and adaptations.

I claim:

1. An educational device comprising a block of plastic material formed at the outset to show one or more portions of the block as though sculptured, said block having the rest thereof left blank and unsculptured whereby an object may be sculptured from the block by sculpturing the blank portions, so that the first mentioned portions form a part of the surface of the object when completed.

2. An educational device comprising a block of plastic material formed at the outset to show one or more portions appearing as though sculptured, said first mentioned portions being distinguishable although obscured by projecting portions of excess material that is blank and unsculptured, whereby an object may be sculptured from the block by sculpturing the blank portions so as to remove the excess material, so that the first mentioned portions form a part of the surface of the object when completed.

3. An educational device comprising a block of plastic material formed at the outset to show one or more portions appearing as though sculptured, said portions being between projecting portions of excess material that is blank and unsculptured, whereby an object may be sculptured from the block by carving off the intervening excess material using the first mentioned portions as a guide so that the first mentioned portions form a part of the surface of the object when completed.

4. An educational device comprising a block of plastic material formed to provide a frame and an object in said frame to be sculptured, the object being encased within and integral with the frame in such a manner that one or more portions of the object may be sculptured from portions of the frame.

5. An educational device as set forth in claim 4 including one or more cross bars of plastic material integral with portions of the object and also with portions of the frame, whereby one or more portions of the object may be sculptured from portions of the cross bars.

6. An educatonal device comprising a block of plastic material formed to provide a base portion and an object thereon to be sculptured together with one or more bars integral with the base portion and with the object portion, whereby one or more portions of the object may be sculptured from portions of the bars.

In witness of the foregoing I affix my signature.

VICTOR B. NELSON.